Figures 1, 2:
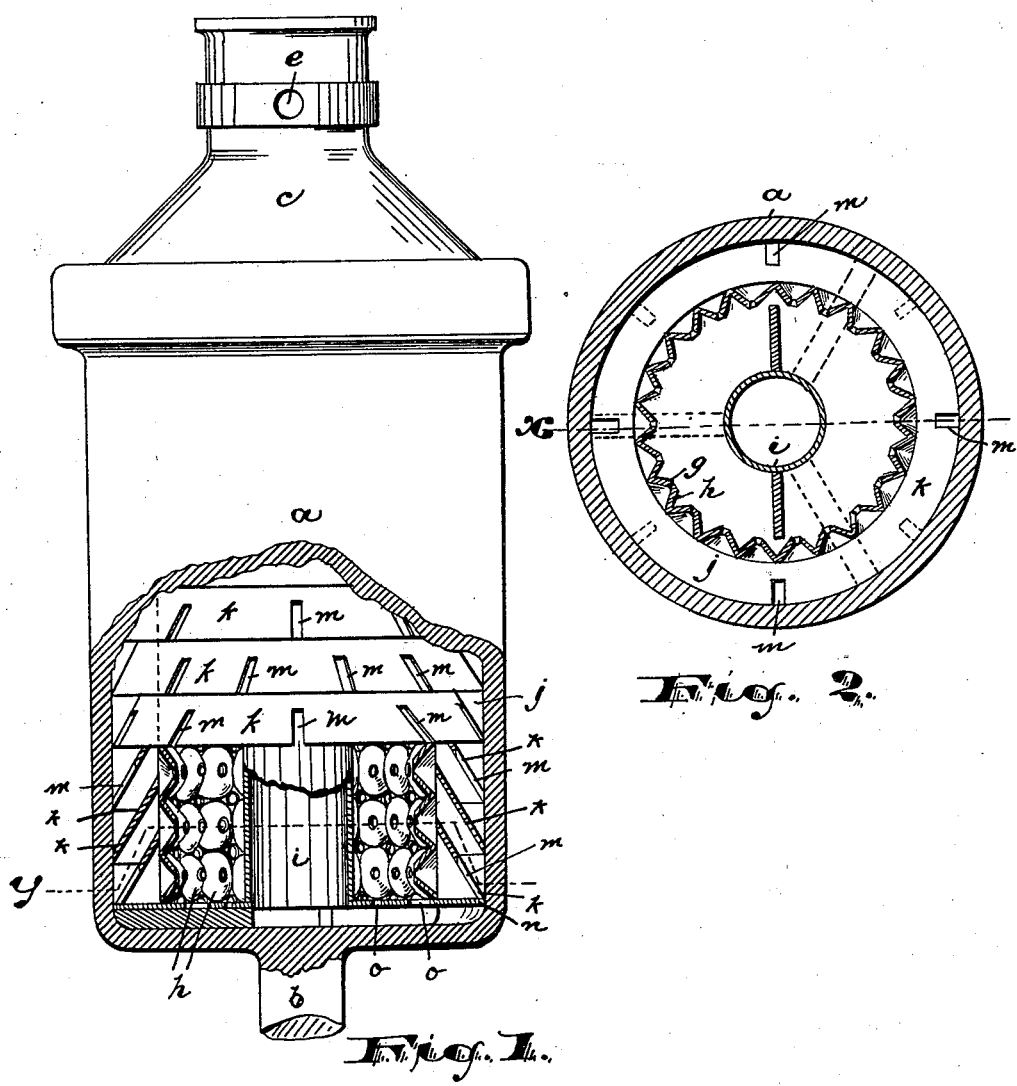

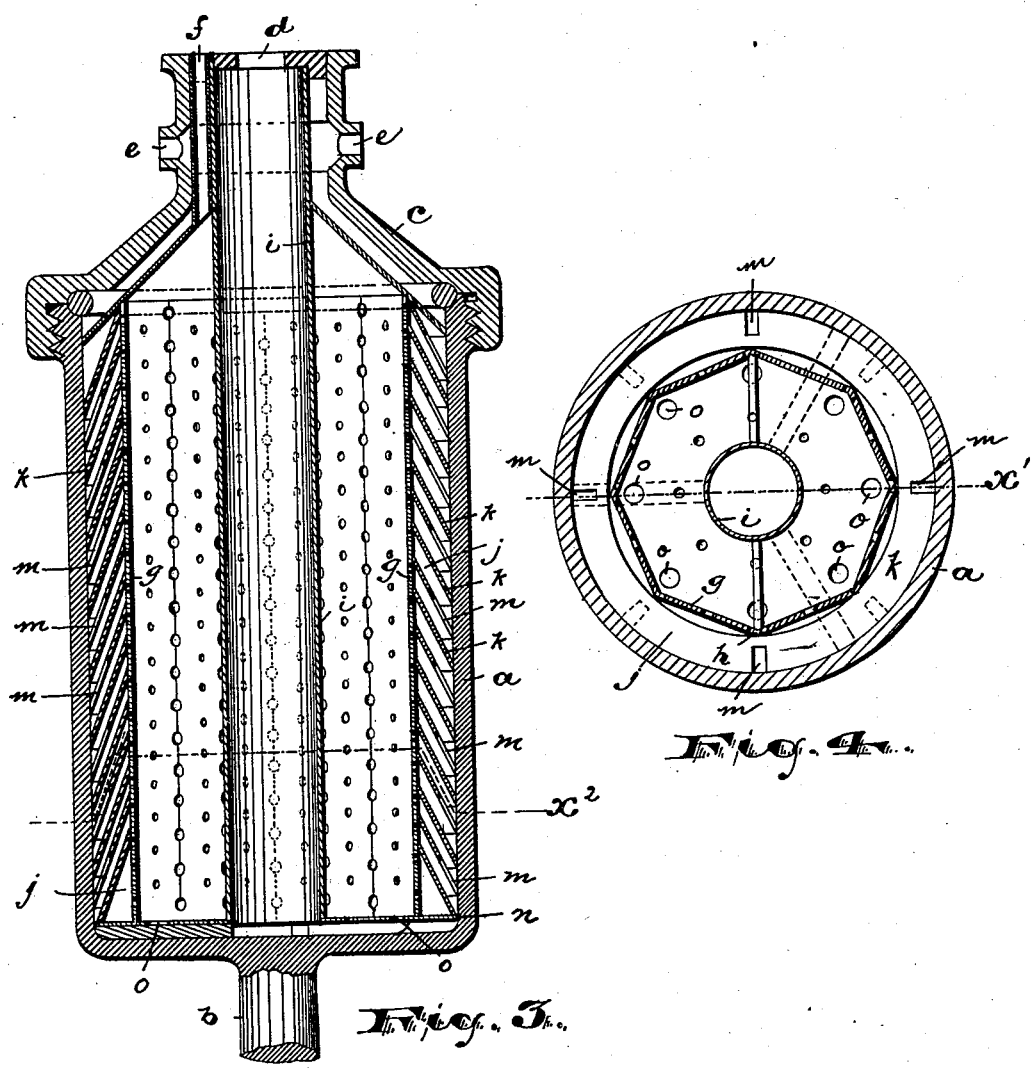

UNITED STATES PATENT OFFICE.

OSCAR ANDERSON, OF KEARNY, NEW JERSEY, ASSIGNOR TO NATIONAL DAIRY MACHINE COMPANY, A CORPORATION OF NEW JERSEY.

CENTRIFUGAL CREAMER.

SPECIFICATION forming part of Letters Patent No. 723,354, dated March 24, 1903.

Application filed September 1, 1900. Serial No. 28,744. (No model.)

*To all whom it may concern:*

Be it known that I, OSCAR ANDERSON, a citizen of the United States, residing at Kearny, in the county of Hudson and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to facilitate the cream-separating operation; to enable a bowl of a given size and moving at a given rate of speed to effectively separate the cream from the blue or skim milk at a more rapid rate of passage through the bowl, and thereby increase the capacity of the creamer; to provide a simple, durable, and strong interior device and one that can be easily, quickly, and conveniently cleaned and the parts assembled in and removed from the bowl, and to secure other advantages and results, some of which may be referred to in connection with the description of the working parts.

The invention consists in the improved centrifugal creamer and in the arrangements and combinations of the parts of the same, all substantially as will be hereinafter set forth and finally embraced in the clauses of the claim.

Referring to the accompanying drawings, in which like letters of reference indicate corresponding parts in each of the views, Figure 1 is a side elevation, partly in vertical section, taken at line X, Fig. 2, of a centrifugal creaming-bowl and interior device of my improved construction. Fig. 2 is a horizontal section of the same, taken on line $y$ of Fig. 1; and Figs. 3 and 4 are vertical and horizontal sections of the same, showing a modified construction, the section of Fig. 3 being taken at a line $x'$ of Fig. 4 and that of Fig. 4 being taken at line $x^2$ of Fig. 3.

In said drawings, $a$ indicates a bowl of any usual construction mounted upon a shaft $b$, by which rapid rotary movement is transmitted to said bowl from any source of power, said bowl being open at the top and provided with a cover $c$, having an inlet-opening $d$ for the new or whole milk, an exit opening or openings $e$ for the skimmed or blue milk, and an exit-opening $f$ for the cream. Said cover may be secured upon the bowl in any ordinary manner, and the joint may be packed to prevent leakage. Within said bowl is arranged the interior device for facilitating the creaming operation. Said device comprises an inner partition $g$, which is cylindrical or approximately cylindrical in plan, as indicated in Figs. 2 and 4, and extends from at or near to the open top of the bowl to the bottom or near to the bottom thereof. In the preferred construction this hollow cylindrical partition $g$ is provided with perforated protuberances $h$ $h$, such as are shown in my prior patent, No. 576,994; but the said protuberances may be otherwise shaped. Said partition $g$ is arranged concentrically with the central milk-supply tube $i$, extending down from the inlet-opening $d$ of the cover, said partition being disposed about midway between said tube $i$ and the inside walls of the bowl and outside of the vertical line of the cream-exit $f$, or what is sometimes known as the "cream-wall," formed when the bowl is in effective operation. In the construction of my prior patented invention above referred to this said partition $g$ was disposed so as to lie against or quite near to the inner wall of the bowl. In the present case it is made relatively smaller, and a clear annular space $j$ is formed outside of said partition of sufficient width to receive a collection of hollow truncated cones of funnel-shaped ring-like plates $k$, which lie within the space $j$ and extend from the outside of the partition $g$ to the inside wall of the bowl. The smaller ends of the rings lie within the large ends, overlapping, as shown in Figs. 1 and 3, passages being formed between said rings, which cross at an inclination the radii of the center of movement of the bowl, so that the blue milk near the periphery of the bowl will be divided into thin film-like strata. Said plates are preferably joined by solder or otherwise to the partition $g$, so as to be easily removable from the bowl together and so as to be firmly held in proper relative position when in operative position within the bowl; but said rings may be independent of and separable from the said partition and be held together and in relative positions by any suitable means.

The hollow cones or funnels at their outer edges are provided with openings or passages for the blue milk, and these said passages are staggered, so that the said blue milk in passing up through the bowl or toward the exit-passages $e$ will take a back-and-forth course between the rings, and thus be effectually brought into contact with the inclined surfaces of said rings, and thus any small particles of cream in said blue milk will be caught by the films of cream lying on the outer inclined faces of said plates and be absorbed or agglomerated by said films and upon a proper accumulation of said particles will flow therewith inward toward the cream-wall.

In operation the new or whole milk is conducted by suitable means into the open upper end of the pipe or tube $i$ and by said pipe or tube is led beneath the horizontal partition $n$, where said milk spreads and flows upward through the perforations $o\ o\ o$, Fig. 4, and is brought in contact with the cylindrical partition $g$. The larger particles or globules of cream are forced immediately toward the cream-wall, while the heavier blue milk, containing the fine or small particles or globules, is thrown outward into contact with said partition $g$ and caused to pass through the blue-milk perforations and enter between the rings. Here said blue milk as it flows upward between said plates and peripheral openings $m$ takes a horizontally backward-and-forward course, so that there is a thorough contacting of the blue milk with the inwardly-inclined surfaces of said plates. The cream accumulating up the outside surface of the inwardly-inclined plates is forced inwardly by the heavier blue milk and being led inward by said inclined surfaces and those of the partition $g$ passes through the cream-perforations of said partition $g$ and thence flows inward toward the cream-wall and with the body of cream thereof flows upward and out through the cream-exit $f$ in the cover.

I am aware that various modifications and changes other than those herein shown can be made in the construction of my improved creamer, and I do not wish to be understood as limiting myself to the exact construction and relation of parts illustrated in the drawings as specifically detailed excepting as the state of the art may require.

Having thus described the invention, what I claim as new is—

1. In a centrifugal creamer, the combination with the bowl, of a perforated partition arranged concentric with the axis of rotation of said bowl, and a vertical series of rings arranged between the said partition and the wall of the bowl, flow-spaces being formed between said rings, and passages being formed in said rings permitting the flow of milk from one space to the next in order, substantially as set forth.

2. In a centrifugal creamer, the combination with the bowl, of a perforated cylindrical partition having perforations and protuberances and a vertical series of rings arranged outside of said partition between it and the wall of the bowl, substantially as set forth.

3. In a centrifugal creamer, the combination with the bowl having a cream-exit eccentric to the axis thereof, of a perforated cylindrical partition arranged outside of the vertical line of the cream-exit and a vertical series of conical rings disposed outside of said partition, substantially as set forth.

4. In a centrifugal creamer, the combination with the bowl, of a perforated cylindrical partition and a vertical series of separate rings arranged outside of said partition and having inclined surfaces with openings at their outer edges, the said openings being staggered to effect a horizontal back-and-forth flow in the spaces as the fluid flows upward through the bowl near the peripheral wall thereof, substantially as set forth.

5. In a centrifugal creamer, the combination with the bowl, of a perforated partition separating the space within the bowl into an inner and an outer chamber, the outer chamber being subdivided by a vertical series of separate horizontal rings attached to said perforated partition, said rings having inclined surfaces and openings or passages permitting an upflow of fluid from one passage between said plates to the next in order, substantially as set forth.

In testimony that I claim the foregoing I have hereunto set my hand this 20th day of August, A. D. 1900.

OSCAR ANDERSON.

Witnesses:
CHARLES H. PELL,
RUSSELL M. EVERETT.